(12) United States Patent
Li et al.

(10) Patent No.: US 10,381,645 B2
(45) Date of Patent: Aug. 13, 2019

(54) LOW COST RECHARGEABLE BATTERY AND THE METHOD FOR MAKING THE SAME

(71) Applicant: BETTERGY CORP., Peekskill, NY (US)

(72) Inventors: Lin-Feng Li, Croton-On-Hudson, NY (US); Min Chen, Millwood, NY (US); Quan Fan, Mohegan Lake, NY (US); Xueliang Dong, Peeksill, NY (US)

(73) Assignee: BETTERGY CORP., Peekskill, NY (US)

( * ) Notice: Subject to any disclaimer, the term of this patent is extended or adjusted under 35 U.S.C. 154(b) by 2 days.

(21) Appl. No.: 15/378,200

(22) Filed: Dec. 14, 2016

(65) Prior Publication Data

US 2018/0013144 A1 Jan. 11, 2018

Related U.S. Application Data

(60) Provisional application No. 62/266,833, filed on Dec. 14, 2015.

(51) Int. Cl.
*H01M 4/00* (2006.01)
*H01M 4/505* (2010.01)
(Continued)

(52) U.S. Cl.
CPC ........... *H01M 4/505* (2013.01); *H01M 4/661* (2013.01); *H01M 4/74* (2013.01); *H01M 4/50* (2013.01);
(Continued)

(58) Field of Classification Search
CPC .......... H01M 4/30; H01M 10/28; H01M 4/50; H01M 4/364; H01M 4/625; H01M 2004/028
See application file for complete search history.

(56) References Cited

U.S. PATENT DOCUMENTS 4,451,543 A 5/1984 Dzieciuch et al.
4,520,005 A 5/1985 Yao
(Continued)

*Primary Examiner* — Cynthia H Kelly
*Assistant Examiner* — Monique M Wills
(74) *Attorney, Agent, or Firm* — Robert W. Morris; Eckert Seamans Cherin & Mellott, LLC

(57) ABSTRACT

Low-cost electrochemical energy storage devices having electrochemical cells containing zinc electrodes in aqueous electrolytes, which exhibit superior cycle performance, preferably comprise the following elements:

(a) a cathode formed of manganese dioxide particles, preferably doped with at least one of magnesium, strontium, barium, calcium, and lanthanum, wherein the manganese dioxide particles preferably form at least one of (1) a delta manganese dioxide structure and (2) a todokorite manganese dioxide structure;

(b) an anode formed of particles comprising zinc, wherein the particles are preferably treated with at least one of bismuth, indium, gallium, antimony, and tin;

(c) a mixed ion electrolyte solution with a pH greater than or equal to three and less than or equal to seven, wherein the solution preferably comprises at least one monovalent salt and at least one divalent salt; and (d) a mesh as cathode current collector comprising at least one of titanium, stainless steel, tantalum, and niobium, wherein the mesh is preferably coated by an electrically conductive and yet oxidation resistant material comprising but not limited to carbon.

27 Claims, 4 Drawing Sheets

(51) Int. Cl.
  *H01M 4/66*   (2006.01)
  *H01M 4/74*   (2006.01)
  *H01M 4/02*    (2006.01)
  *H01M 4/50*    (2010.01)
  *H01M 4/75*    (2006.01)

(52) U.S. Cl.
  CPC ............. *H01M 4/663* (2013.01); *H01M 4/75* (2013.01); *H01M 2004/028* (2013.01)

(56) References Cited

U.S. PATENT DOCUMENTS

| | | |
|---|---|---|
| 4,929,520 A | 5/1990 | Kordesch et al. |
| 5,156,934 A | 10/1992 | Kainthia et al. |
| 6,187,475 B1 | 2/2001 | Oh et al. |
| 2003/0165744 A1* | 9/2003 | Schubert ............. H01M 2/0257 429/303 |
| 2011/0020745 A1* | 1/2011 | Yu ........................ G03G 9/0806 430/108.21 |
| 2012/0034515 A1 | 2/2012 | Kang et al. |
| 2014/0255796 A1* | 9/2014 | Matsuoka ........... H01M 4/0445 429/339 |
| 2015/0244031 A1 | 8/2015 | Adamson et al. |
| 2017/0101719 A1* | 4/2017 | Alvarez .................... C25B 9/08 |
| 2017/0207447 A1* | 7/2017 | Yadav ..................... H01M 4/30 |

* cited by examiner

δ-MnO₂

α-MnO₂

LOW COST RECHARGEABLE BATTERY AND THE METHOD FOR MAKING THE SAME

CROSS-REFERENCE TO RELATED APPLICATION

This application is based upon and claims the benefit of the priority of the filing date of U.S. patent application Ser. No. 14/520,513 filed Oct. 22, 2014, and U.S. Provisional Patent Application Ser. No. 62/266,833, filed Dec. 14, 2015, both of which applications are incorporated herein by reference in their entirety.

STATEMENT REGARDING FEDERALLY SPONSORED RESEARCH OR DEVELOPMENT

The invention described herein was made partially with financial support from the United States Government under contract No. DE-AR0000382, awarded by the ARPA-E of U.S. Department of Energy; and from the NYSERDA under contract No. 48186. The United States Government may have certain rights in this invention.

FIELD OF THE INVENTION

The present invention relates to electrochemical energy storage devices and, in particular, to the batteries which contain zinc electrodes in aqueous electrolyte.

BACKGROUND OF THE INVENTION

There is a genuine demand for the high performance batteries with performance characteristics that include high power, high energy, high reliability and safety, longer life, as well as low cost and environmentally benign.

Various battery chemistries have been explored as higher energy density alternatives to conventional lead acid and nickel cadmium rechargeable batteries, as these incumbent battery technologies cannot keep up with the increasing energy requirements of new applications and also pose environmental issues with respect to production and disposal.

Zinc has long been recognized as the ideal electrode material, due to its high specific capacity (813 Ah/kg), low electrochemical potential (namely higher cell voltage), high coulombic efficiency, reversible electrochemical behavior, high rate capability, high abundance in the early crust and therefore low material cost, and environmental friendliness. Therefore, rechargeable zinc cells containing zinc electrodes, such as, for example, nickel/zinc, silver/zinc, $MnO_2$/zinc and zinc air cells, are of significant interest. As compared to nickel cadmium cells, nickel/zinc cell has an open cell voltage over 1.72 V vs. 1.4 V for nickel cadmium cell. Significant environmental issues have been found in recent years with the manufacture and disposal of toxic nickel cadmium cells. Therefore, there is a strong need of developing high power, long cycle life and environmentally friendly rechargeable batteries with zinc as the anode material. Many batteries containing a zinc electrode are known and have been practiced in the art, including non-rechargeable zinc alkaline batteries.

Despite these advantages, conventional rechargeable zinc cells suffer short cycle life. This problem is caused by three major reasons: shape change of the electrode, dendrite shorting and electrode shedding during the cycle. In a conventional zinc electrode charge/discharge cycle, zinc is dissolved into an alkaline electrolyte during discharge and re-deposited onto the electrode during charge. Zinc tends to redistribute over a number of charge/discharge cycles, which causes a shape change of the electrode and reduces the battery capacity and cycle life.

The recent introduction of zinc ion rechargeable batteries in aqueous electrolytes has attracted great attention. Such zinc ion battery essentially consists of zinc metal as anode and $ZnSO_4$ aqueous solution as electrolyte. In these batteries, $\alpha$-$MnO_2$ has attracted considerable attention as the zinc ion intercalation cathode due to its structure. Since $\alpha$-$MnO_2$ has a large open tunnel (2×2) structure, it was found that zinc ions can be intercalated and de-intercalated into the electrode material reversibly at high rate according to the following reaction:

$$Zn^{2+}+2e^-+\alpha\text{-}MnO_2 \rightarrow ZnMn_2O_4$$

Theoretically, $\alpha$-$MnO_2$ has specific capacity of 616 mAh/g. In combination with the high specific capacity of Zn (i.e. 820 mAh/g), this new electrochemical coupling has a theoretical specific energy of 739 Wh/kg (assuming OCV~2.1 V). However, when an aqueous electrolyte is used, the practical average cell voltage realized is only about 1.5 V and specific capacity of $\alpha$-$Mn_2$ is only 150 mAh/g,—equivalent to 190 Wh/kg on the cell level. However, the cycle life of these batteries fails to meet current application requirements due to the degradation of the zinc and $\alpha$-$MnO_2$ electrodes.

For large scale energy storage, system safety is of critical importance. Manganese oxide or its derivatives have been proposed as the cathode materials for lithium ion batteries, where non-aqueous electrolyte consisting of organic solvent and lithium salts is used. Due to the flammable nature of the electrolyte, the battery is not intrinsically safe.

A water-based electrolyte is an attractive alternative and alkaline electrolytes with pH greater than 7 have been explored to develop the battery system. The development of a rechargeable alkaline battery has attracted great attention in this aspect. In spite of early efforts, such as that disclosed in U.S. Pat. No. 4,929,520, rechargeable alkaline cells have suffered the severe drawback of very short cycle life (<50 cycles).

A significant breakthrough was made by Ford Motor Company in 1980s with the development of a $MnO_2$ electrode that was truly rechargeable in the alkaline electrolyte. In U.S. Pat. Nos. 4,451,543 and 4,520,005, the chemically modified bimessite $MnO_2$ electrode with introduction of foreign metal ions, including Ag, Al, Ba, Bi, Ca, Ce, Cu, K, La, Pb, Sb, Sn, Y and Zn ions. Bi doped bimessite $MnO_2$ electrode maintained 85% theoretical capacity for over 800 cycles. An alternative method was also proposed by Kainthla et al. (R. C. Kainthla, D. J. Manko, U.S. Pat. No. 5,156,934 (1992)), which enabled the low of graphite addition in the electrode. Unfortunately, a product of zinc discharging is soluble in alkaline electrolyte in the form of zincate. The formation of zincate not only causes shape change and dendrite formation at zinc electrode but also affects the cycle performance of $MnO_2$ electrode by reacting with manganese species to form electrochemically inactive species such as hetaerolite (ZnO—$Mn_2O_3$). In fact, once paired with zinc electrode in the full cell configuration, even chemically modified $MnO_2$ electrodes cannot have a cycle life sufficient to make them commercially viable.

Another issue with the development of rechargeable alkaline Zn—$MnO_2$ batteries is associated with the zinc electrode development. In an alkaline electrolyte, zinc has a tendency to form dendrites and to have shape change—which lead to shortened cycle life of the battery.

In order to address the issues associated with rechargeable Zn/MnO$_2$ batteries with an alkaline electrolyte, neutral electrolytes such as ZnSO$_4$ or ZnCl$_2$ are employed. In a neutral electrolyte, zinc dendrite growth can be substantially hindered. However, zinc tends to passivate, forming inactive zinc hydroxide or zinc oxide. These materials cannot be effectively reduced during charging, leading to high polarization and cell capacity decay.

In addition, some phase types of MnO$_2$ can also suffer capacity decay in neutral electrolyte. Spinel type material (LiMn$_2$O$_4$) has been evaluated as the cathode materials in the previous work; however, the material has rather low specific capacity of less than 150 mAh/g. The cycle life of the battery cannot meet the commercial requirements.

In U.S. Pat. No. 6,187,475, Oh et al introduce manganese salt in the electrolyte, and better cycle performance was achieved. However, commercially viable cycle life and zinc passivation issues were never resolved.

In WO2013112660 A1 and US 2015/0244031, Adamson et al disclosed an electrolyte formed with a divalent cation. However, Adamson did not mix the divalent cation with monovalent anions, and the cell performance was insufficient.

Recent uses of zinc ion rechargeable batteries in aqueous electrolyte solutions have attracted great attention. An exemplary zinc ion battery essentially includes zinc metal as anode, α-MnO$_2$ as the zinc ion intercalation cathode and ZnSO$_4$ aqueous solution as electrolyte. Since α-MnO$_2$ has a large tunnel (2×2) structure, it was found that zinc ions can be intercalated and de-intercalated into the electrode material reversibly at high rate according to the following reaction:

$$Zn^{2+}2e^- + \alpha\text{-MnO}_2 \rightarrow ZnMn_2O_4$$

However, the actual specific capacity of the material is low and cycle life is limited.

SUMMARY OF THE INVENTION

It is, therefore, an object of the present invention to provide a rechargeable electrochemical cell with much improved performance and a method of making the same.

This object, as well as further objects that will become apparent from the discussion that follows, is achieved in accordance with the present invention by providing an electrochemical cell with an anode, a cathode, an electrolyte and a cathode current collector as follows:

In a first preferred embodiment the electrochemical cell comprises a cathode formed of manganese dioxide particles or manganese dioxide doped with a first metal; and an anode formed of particles comprising zinc.

In a second preferred embodiment, the electrochemical cell comprises an anode formed of zinc particles that are preferably treated with at least one of bismuth, indium, aluminum, and tin.

In a third preferred embodiment, the electrochemical cell comprises a cathode comprising manganese dioxide, an anode comprising zinc, and a mixed ion electrolyte solution with a pH greater than or equal to three and less than or equal to seven, wherein the solution preferably comprises monovalent salts and divalent salts.

In a fourth preferred embodiment, the electrochemical cell has a mesh as cathode current collector which comprises at least one of titanium, stainless steel, tantalum, and niobium, wherein the mesh is preferably coated by an electrically conductive material comprising but not limited to carbon.

The electrochemical cell according to the present invention thus preferably comprises:

(a) a cathode formed of manganese dioxide particles, preferably doped with at least one of magnesium, strontium, barium, calcium, and lanthanum, wherein the manganese dioxide particles preferably form at least one of (1) a delta manganese dioxide stricture and (2) a todokorite manganese dioxide structure;

(b) an anode formed of particles comprising zinc, wherein the particles are preferably treated with at least one of bismuth, indium, gallium, antimony and tin;

(c) a mixed ion electrolyte solution with a pH greater than or equal to three and less than or equal to seven, wherein the solution preferably comprises at least one monovalent salt and at least one divalent salt; and (d) a mesh as cathode current collector comprising at least one of titanium, stainless steel, tantalum, and niobium, wherein the mesh is preferably coated by an electrically conductive, and yet oxidation resistant, material comprising but not limited to carbon.

BRIEF DESCRIPTION OF THE DRAWINGS

This invention may be more readily understood by reference to the following drawings wherein.

DETAILED DESCRIPTION OF THE INVENTION

The present disclosed concepts may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, as used herein, the singular form of "a", "an", and "the" include plural references unless the context clearly dictates otherwise.

Figure 1A:
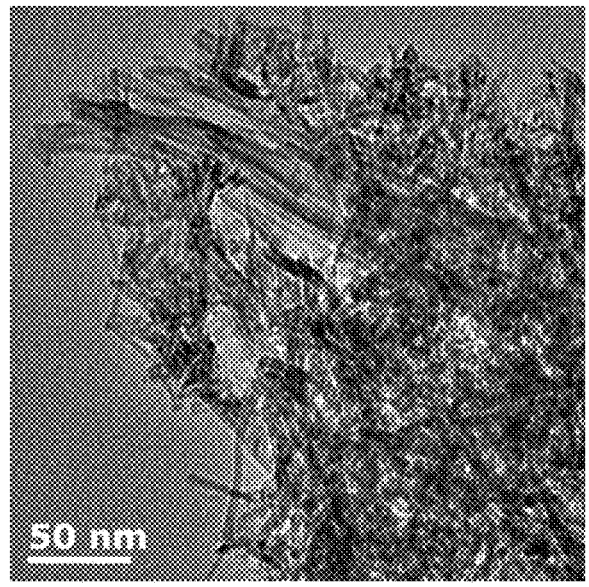
FIGS. 1A and 1B are transmission electron microscope images of various structures of manganese dioxide.
Figure 1B:
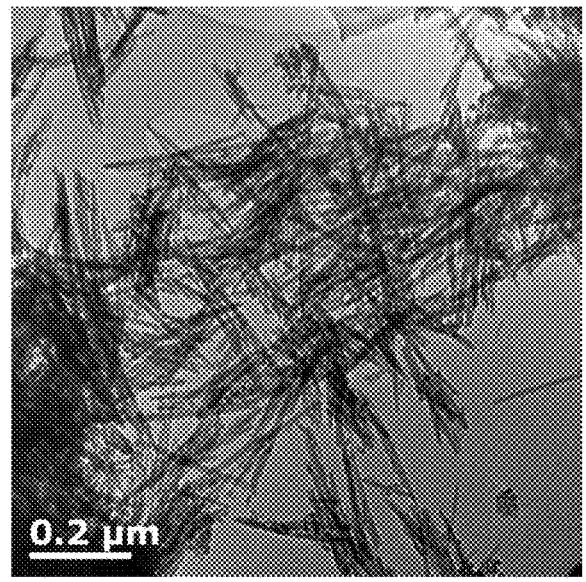

FIGS. 1A and 1B are transmission electron microscope images of various structures of manganese dioxide. FIG. 1A is a transmission electron microscope image of a magnesium doped delta-manganese dioxide crystalline structure. Typically, delta-manganese dioxide is a poorly organized, densely packed crystalline structure having small tunnels, which generally make it difficult for particles, such as zinc, to intercalate into when used in a rechargeable battery. As a result, persons of ordinary skill in the art often overlook this structure as a potential material in a manganese dioxide electrode. However, as shown in FIG. 1A, magnesium doped delta-manganese dioxide exhibits a considerably well organized, large tunnel, yet densely packed structure, having tunnels large enough for the intercalation of ions within the structure, while being densely packed enough to allow reactivity of the ions within the structure. As a result, magnesium doped delta-manganese dioxide has shown great success for use in rechargeable electrochemical cells that utilize the intercalation of zinc ions during charge and discharge.

FIG. 1B is a transmission electron microscope image of an alpha-manganese dioxide crystalline structure. Without metal doping, in contrast to the delta-manganese dioxide structure, an alpha-manganese dioxide structure contains considerably larger tunnels allowing for greater intercalation of zinc in a rechargeable battery. As a result, alpha-manganese dioxide has attracted considerably more attention for use as electrode material in rechargeable batteries. Conversely, however, the metal doped structure of delta-manganese dioxide has proven to be considerably better than alpha-manganese dioxide under substantially identical circumstances.

Thus, metal doping has been shown to yield unpredictable results in the value each of the various structures of manganese dioxide. When manganese dioxide is doped with one or more metals, different structures have proven to exhibit considerably improved performance in various electrochemical cells, including rechargeable zinc batteries.

TABLE 1

Summary of synthesized $MnO_2$ with different phase structures

| # | Sample ID | | Reactants & Products |
|---|---|---|---|
| 1 | 120513-1 | δ (or amo)-$Mn_2$ | $8 KMnO_4 + C_6H_{12}O_6$ (glucose) |
| 2 | 120913-1 | α-$MnO_2$ | $2KMnO_4 + 3MnSO_4 + 2H_2O + HAc$ |
| 3 | 121013-1 | δ (or amo)-$MnO_2$ | $KMnO_4 + C_3H_5(OH)_3$ (glycerol) |
| 4 | 121113-1 | β-$MnO_2$ | $2MnSO_4 + 4KOH + O_2$ |
| 5 | 121913-1 | α-$MnO_2$ | $2Mn(NO_3)_2 + 3NaOH + (NH_4)_2S_2O_8$ |
| 6 | 121913-2 | α-$MnO_2$ | $2Mn(Ac)_2 + 4NaOH + (NH_4)_2S_2O_8$ |
| 7 | 121913-3 | Todorokite-$MnO_2$ | $2MnSO_4 + 4NaOH + (NH_4)_2S_2O_8 + MgSO_4$ |
| 8 | 122313-1 | α-$MnO_2$ | $2Mn(NO_3)_2 + 3NaOH + (NH_4)_2S_2O_8$ |
| 9 | 122413-1 | Todorokite-$MnO_2$ | $2MnSO_4 + 4NaOH + (NH_4)_2S_2O_8 + MgSO_4$ |
| 10 | 122713-1 | Todorokite-$MnO_2$ | $KMnO_4 + C_3H_5(OH)_3$ (glycerol) + $MgSO_4$ |
| 11 | 123113-1 | Todorokite-$MnO_2$ | $2MnSO_4 + 4KOH + (NH_4)_2S_2O_8 + MgSO_4$ |
| 12 | 010814-1 | α-$MnO_2$ | $2KMnO_4 + 3MnSO_4 + 2H_2O$ |
| 13 | 010814-3 | amorphous-$MnO_2$ | $2KMnO_4 + i$-PrOH |
| 14 | 010814-4 | amorphous-$MnO_2$ | $2KMnO_4$ + oxalic acid + $2H_2O$ |
| 15 | 011014-1 | Zn doped α-$MnO_2$ | $MnSO_4 + 2KMnO_4 + 3MnSO_4 + 2H_2O$ |
| 16 | 011314-1 | Bi doped α-$MnO_2$ | $Bi(NO_3)_3 + 2KMnO_4 + 3MnSO_4 + 2H_2O$ |
| 17 | 011614-1 | Bi doped α-$MnO_2$ | $Bi(ac)_3 + HAc + 2KMnO_4 + PrOH + 2H_2O$ |

Different types of manganese dioxide ($MnO_2$) materials (Table 1), including, but not limited to, alpha (α)-; beta (β-), delta (δ-), amorphous (amo-), and todorokite (Tod-) phase manganese dioxide may be prepared according to methods known in the art. The phase and particle size of the materials may be checked using x-ray diffraction (XRD) and transmission electron microscopy (TEM).

Since Mg doped Tod-$MnO_2$ has shown excellent specific capacity, its preparation method is briefly described. Mg doped Tod-$MnO_2$ was prepared by two-step method by combining synthesis technique for making poorly crystallized layered δ-$MnO_2$ and Tod-$MnO_2$. Briefly, δ-$MnO_2$ was first prepared by reduction of $KMnO_4$ with glycerol in aqueous solution and stirred for 2 hours. The δ-$MnO_2$ was ion-changed with Mg (II) ion by centrifuge separation and addition of 1M $MgSO_4$ solution and stirring for 12 hours. δ-$MnO_2$ was then turned into Mg doped Tod-$MnO_2$ by transferring the δ-$MnO_2$ slurry into a Teflon-lined stainless steel autoclave, and being heated in oven at 180° C. for another 12 hours. After cooling, the product was washed three times with distilled water and one time with isopropanol, finally dried in an oven at 75° C. for overnight. The dry powder is then collected for use.

As shown in FIGS. 1A and 1B, δ-$MnO_2$ contains most of nano-needles with an average width of ~7 nm and length of ~200 nm, while α-$MnO_2$ mainly consists of nano-needle with a diameter of ~10-12 nm and a length of 200-300 nm. A metal doped $MnO_2$-based metal oxide cathode can be depicted with the molecular formula $Mn_{1-x}M_xO_2$, where the dopant M can be, for instance, Mg, Sr, Ba, Ca, La or mixture; $MnO_2$ base can be, for instance, α, β, δ or Todorokite phase structure. Further, the dopant amount x can have many concentrations, including, but not limited to from 0 to 0.3; with 0 to 0.1 being the optimum concentration. Mg, Sr, Ba, Ca, La or mixed thereof doped δ-$MnO_2$ or doped. Todorokite $MnO_2$; can have multiple dopant percentages, including, but not limited to, from 0.01 percent to 30 percent; with 5 to 10 percent the optimum percentage.

Thus, in an embodiment, the electrochemical cell includes a cathode. In an embodiment, the cathode is formed of manganese dioxide particles. Persons of ordinary skill in the art will understand that manganese dioxide can exist in various crystalline structures, including, but not limited to alpha manganese dioxide, beta manganese dioxide, delta manganese dioxide, amorphous manganese dioxide, and todokorite manganese dioxide. Accordingly, in an embodiment, the cathode is formed of alpha-manganese dioxide. In another embodiment, the cathode is formed of beta manganese dioxide. In yet another embodiment, the cathode is formed of delta manganese dioxide. In another embodiment, the cathode is formed of amorphous manganese dioxide. In another embodiment, the cathode is formed of todokorite-manganese dioxide In various embodiments of the invention, the manganese dioxide particles are not doped or doped with one or more metals. For instance, in an embodiment, the manganese dioxide particles are doped with magnesium, strontium, barium, calcium, and lanthanum, among other metals. For instance, cathodes formed of magnesium doped delta-manganese dioxide are shown to have a very high specific capacity, making such cathodes highly desirable for use in zinc rechargeable batteries.

Mixed Ion Electrolyte

Both the phase of active cathode materials and electrolyte formulation can affect the electrode specific capacity and cycle stability. For instance, in a cathode containing α-$MnO_2$ active material, the specific capacity of the active material may be only about 150 mAh/g-$MnO_2$, which is consistent with prior data as listed in U.S. patent application 2012/0034515 A1. In 1 M $MgSO_4$ electrolyte, the specific capacity of the electrode dropped quickly to 113 mAh/g-$MnO_2$ after a 5th cycle.

On the other hand, δ-$MnO_2$, Mg-doped δ-$MnO_2$ and Mg-doped Tod-$MnO_2$ have exhibited stable specific capacity of 180 mAh/g, 180 mAh/g and 200 mAh/g respectively in 1 M $MgSO_4$ electrolyte.

By using mixed monovalent and divalent salt electrolyte containing 1 M $MgSO_4$ 1 M $Li_2SO_4$ 0.7 M $ZnSO_4$ and 0.3

M MnSO$_4$, both δ-MnO$_2$ and Mg-doped δ-MnO$_2$ demonstrated stable specific capacity as high as 300 mAh/g. While not to be bounded by theory, it appears that mixed ion intercalation into the structure of MnO$_2$ stabilizes the material structure during cycling.

Hence, in various embodiments of this invention, an electrochemical cell may include an aqueous electrolyte solution containing mixed monovalent and divalent ions salts. In an embodiment, monovalent ions, including but not limited to lithium, sodium, potassium, or caesium form various salts in the solution, including, but not limited to, lithium sulfate, sodium sulfate, potassium sulfate, or caesium sulfate. Divalent salts containing magnesium, zinc, and manganese, such as but not limited to, magnesium sulfate, zinc sulfate, and manganese sulfate, can stabilize electrode cycle performance.

Metal-Modification for Zinc Electrode

In various embodiments of the invention, a metal-doped zinc electrode is disclosed. In an embodiment, the electrode is an anode that includes zinc particles modified by one or more metals. Such metals can include, but are not limited to, bismuth, indium, aluminum, and tin.

The metal-doped zinc electrode can be formed in various configurations and structures in accordance with various embodiments. For instance, in an embodiment, the electrode may be formed of electroplated zinc. In another embodiment, the electrode may be formed of zinc powder, zinc alloy powder, and zinc oxide.

In many instances, zinc-based cells fail because the charging voltage reaches their limit (2.2 V). Surprisingly, cells made with used zinc electrode and new MnO$_2$ do not work well, while cells made with used MnO$_2$ electrode and new zinc electrode can continue to cycle. Also, white precipitation on the zinc electrode, which is likely ZnO, plays a role in reduced cycle stability. This leads to the conclusion that due to the hydrogen evolution and resulting pH change of the electrolyte, zinc ions deposit as ZnO on the zinc electrode. Such ZnO can hardly be charged back to zinc in the subsequent charging process, which could lead to the early cell failure.

While not bounded by theory, the metal modified Zn electrode can dramatically improve the reversibility in electrolyte with pH ranging from 3 to 7.

Figure 2:
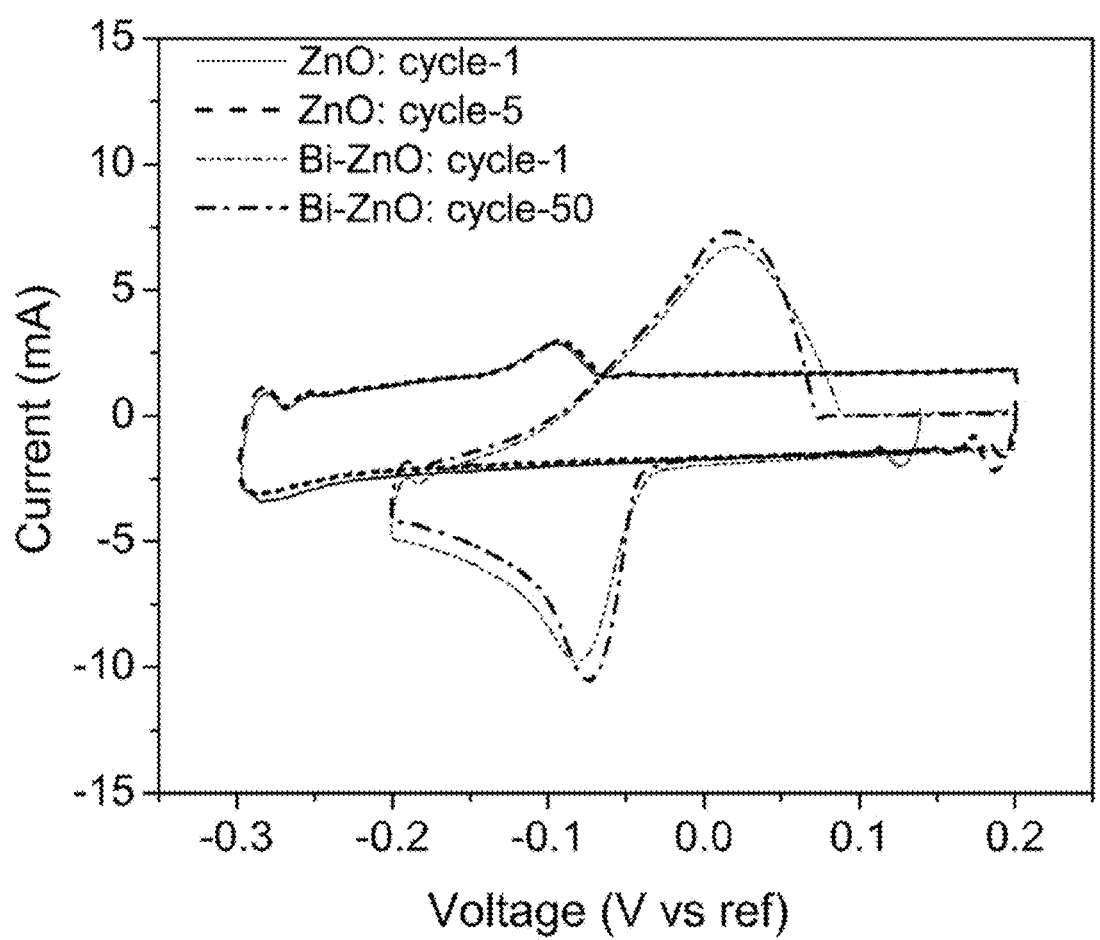
FIG. 2 is a graph showing Cyclic Voltammetries (CVs) of ZnO electrodes with and without Bi treatment.

FIG. 2 is a cyclic voltammetry (CV graph showing current versus voltage) of ZnO electrodes with and without Bi treatment. During the discharge process of the battery, small amount of Zn ions will be converted to ZnO via the side reaction. As shown in FIG. 2, as voltage is increasingly applied to a ZnO electrode, there is little change in current. Further, it does not change over time. For instance, at cycle 1, ZnO exhibits a nearly identical lack of reactivity as it does at cycle 5. Therefore, the electrochemical activity of the Zn electrode in the battery decreases cycle-by-cycle.

In contrast, bismuth treated ZnO (Bi—ZnO) exhibits a considerably high degree of activity. Although the ZnO formed during discharge process, it can be charged back to Zn when Bi exists. Notably, after 50 cycles, Bi—ZnO is able to maintain activity at a high level and to a nearly identical extent as at cycle 1. These results have led to the conclusion that metal modified ZnO particles, particularly particles treated with bismuth, allow for a drastically increased cycle life, cycle stability, and specific capacity.

As shown in the CV study (FIG. 2), it is clear that ZnO is highly irreversible in neutral electrolyte while ZnO electrode treated Bi solution showed excellent reversibility in the neutral electrolyte. In an embodiment, the ZnO is treated with one or more metals, such as, for instance, bismuth.

For the Bi treatment, Zn electrodes were quickly immersed into a diluted Bi(NO$_3$)$_2$ solution and then dried in the oven.

Figure 3:
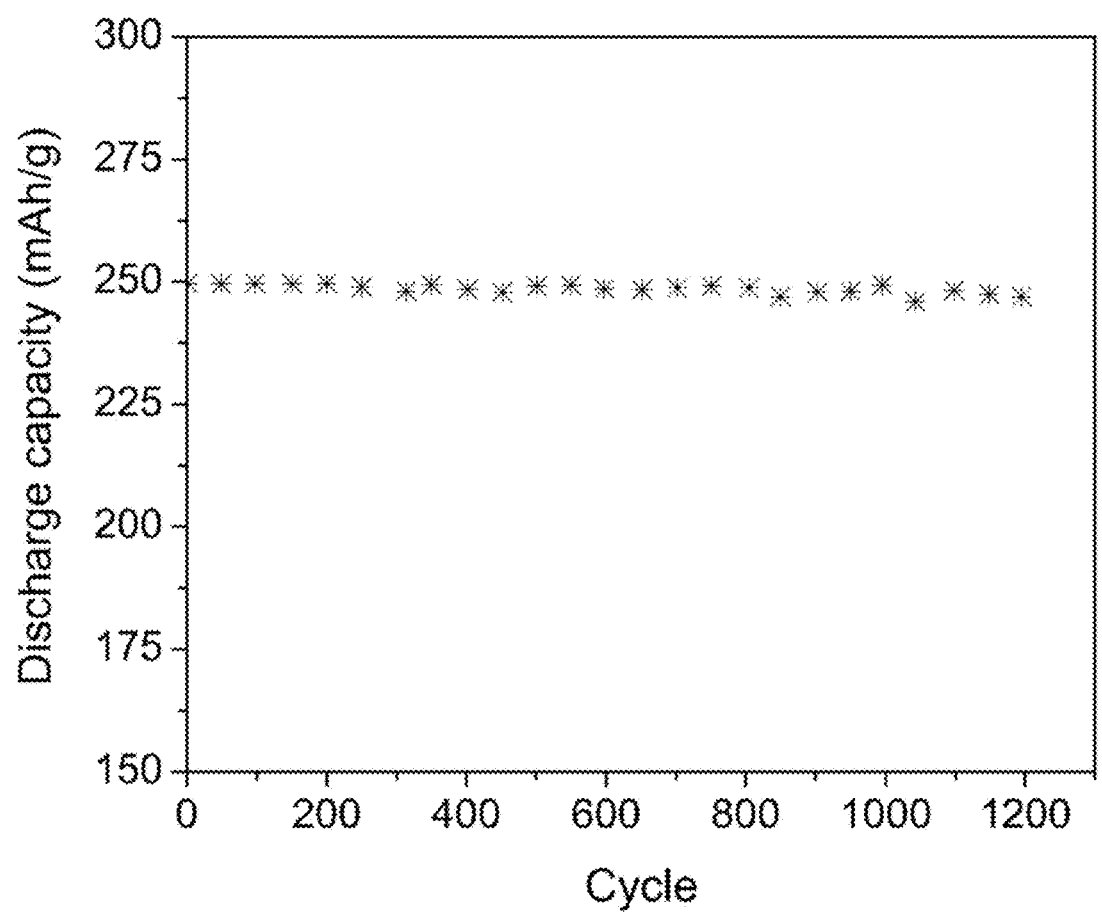
FIG. 3 shows the long-term cycling performance of an electrochemical cell made with Mg doped δ-MnO$_2$ and Bi treated Zinc electrodes.
Figure 4:
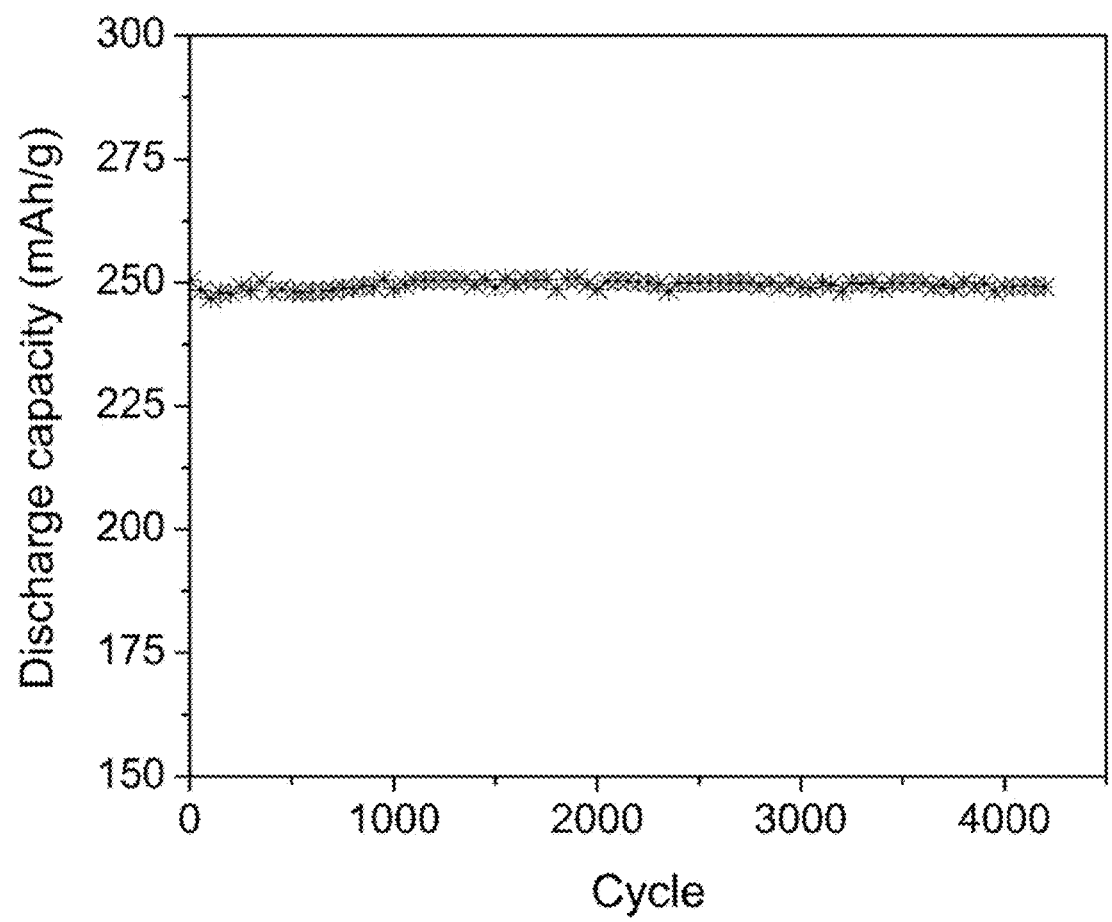
FIG. 4 shows the long-term cycling performance of an electrochemical cell made with Mg doped δ-MnO$_2$ electrode with graphite coated Ti mesh current collector and Bi treated Zinc electrode.

As shown FIGS. 3 and 4, the cell made of Mg doped δ-MnO$_2$ and Bi treated zinc electrode demonstrates fast charging rates and very long cycle numbers (over 1200 cycles). In comparison, the cells made with Mg doped δ-MnO$_{02}$ and conventional zinc electrode exhibit less than 50 cycles even with mixed ion electrolyte.

Conductive Material Coated Metal Mesh as a Current Collector

In accordance with various embodiments of the invention, a metal member may be used as a current collector. In various embodiments, the metal member may include titanium, stainless steel, and/or niobium. Thus, in an embodiment, the metal member is coupled to an electrode. For instance, the metal member may be coupled to the cathode. To increase the electrochemical stability, an electrically conductive material may be coated onto the metal member. In another embodiment, the structure of the metal member may be in the form of a mesh. The conductive material may be made of carbon materials, including, but not limited to, graphite and carbon black. In another embodiment, the conductive material may include, but not be limited to, titanium suboxide, metal nitride, and metal carbide.

In various embodiments, the electrically conductive material is a conductive ink. The conductive ink may be formed of an electrically conductive material, one or more polymer binders, including, but not limited to, thermoplastics such as polyvinylidene fluoride (PVDF) and polyamide-imides (Torlon) and various solvents, such as, but not limited to, n-methyl-2-pyrrolidone (NMP), dimethylformamide, and dimethyl sulfoxide. In various embodiments, the conductive ink is sprayed, painted, or otherwise incorporated onto the mesh, which is coupled to the electrode.

In the prototype development effort, it was recognized that current collector development for the MnO$_2$ electrode is of great importance. An ideal current collector should: 1) have high electric conductivity; 2) be capable of high material loading; 3) be oxidation resistant; and 4) have high oxygen evolution over-potential. Metal meshes, which were widely used in the alkaline systems, could be a solution. However, many of them cannot meet the above requirements. The cells with Ti mesh exhibited increasing resistance and charging voltage. In this invention, we have successfully developed carbon (e.g. graphite) coated metal mesh (e.g. Ti, stainless steel) as the current collector for MnO$_2$ electrode. Specifically, carbon (e.g. graphite power or carbon black) is mixed with polymer binders (e.g. PVDF or Torlon) in NMP solvent to form an ink. The mesh is then coated with brush or any other means known in the art with the ink. After drying in the oven, a thin conductive layer can be formed on the surface of the metal current collector, which can meet the requirements for ideal current collector.

The cells assembled with the cathode containing graphite ink coated Ti mesh current collector acid Bi treated zinc electrode has demonstrated over 4000 cycles (FIG. 4). In comparison, the cell with the same cathode containing stainless steel 304 mesh as current collector can only cycle for less than 10 cycles; while the cell with the same cathode containing titanium mesh current collector can only cycle for less than 50 cycles. Further, as compared with carbon cloth current collector, the coated mesh current collector has much lower cost and can be pressed at high compact pressure.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A rechargeable electrochemical cell, comprising:
a cathode formed of at least one of:
manganese dioxide; and
manganese dioxide modified by at least one of magnesium, strontium, barium, calcium, and lanthanum;
an anode formed of particles comprising zinc, wherein the particles are modified by at least one of bismuth, indium, gallium, antimony, and tin;
a mixed ion electrolyte solution with a pH ranging from 3 to 7, wherein the solution comprises both monovalent salts and divalent salts; and
a mesh current collector for the cathode comprising at least one of titanium, stainless steel, tantalum, and niobium, wherein the current collector is coated in an electrically conductive and yet oxidation resistant material comprising carbon.

2. The rechargeable electrochemical cell of claim 1, wherein the manganese dioxide cathode forms at least one of:
a delta manganese dioxide structure; and
a todokorite manganese dioxide structure.

3. The rechargeable electrochemical cell of claim 2, wherein the manganese dioxide cathode is modified with a metal.

4. The rechargeable electrochemical cell of claim 3, wherein the metal is selected from the group consisting of magnesium, strontium, barium, calcium, and lanthanum.

5. A rechargeable electrochemical cell, comprising:
a cathode formed, at least in part, of manganese dioxide;
an anode formed, at least in part, of zinc, wherein the zinc is modified by a first metal; and
a mixed ion electrolyte solution with a pH ranging from 3 to 7, wherein the electrolyte solution comprises both monovalent and divalent salts.

6. The rechargeable electrochemical cell of claim 5, wherein manganese dioxide is modified by a second metal.

7. The rechargeable electrochemical cell of claim 6, wherein the second metal comprises at least one of magnesium, strontium, barium, calcium, and lanthanum.

8. The rechargeable electrochemical cell of claim 5, further comprising a current collector, coupled to the cathode, coated with electrically conductive yet oxidation resistant material.

9. The rechargeable electrochemical cell of claim 8, wherein the current collector is a mesh comprising at least one of titanium, stainless steel, tantalum, and niobium.

10. The rechargeable electrochemical cell of claim 5, wherein the first metal comprises at least one of bismuth, indium, gallium, antimony and tin.

11. The rechargeable electrochemical cell of claim 5, wherein the electrolyte solution comprises a monovalent salt selected from the group consisting of lithium sulfate, sodium sulfate, potassium sulfate, and cesium sulfate.

12. The rechargeable electrochemical cell of claim 11, wherein the electrolyte solution further comprises a divalent salt selected from the group consisting of magnesium sulfate, zinc sulfate, and manganese sulfate.

13. The rechargeable electrochemical cell of claim 11, further comprising a current collector, coupled to the cathode, coated with electrically conductive and yet oxidation resistant material.

14. The rechargeable electrochemical cell of claim 13, wherein the current collector is a mesh comprising at least one of titanium, stainless steel, tantalum, and niobium.

15. The rechargeable electrochemical cell of claim 5, wherein the manganese dioxide forms at least one of a todokorite manganese dioxide structure and a delta manganese dioxide structure.

16. The rechargeable electrochemical cell of claim 15, wherein the first metal comprises at least one of bismuth, indium, gallium, antimony and tin.

17. The rechargeable electrochemical cell of claim 16, further comprising a current collector, coupled to the cathode, coated with electrically conductive and yet oxidation resistant material.

18. The rechargeable electrochemical cell of claim 17, wherein the current collector is a mesh comprising at least one of titanium, stainless steel, tantalum, and niobium.

19. The rechargeable electrochemical cell of claim 15, wherein the manganese dioxide is modified by a second metal.

20. The rechargeable electrochemical cell of claim 19, wherein the second metal comprises at least one of magnesium, strontium, barium, calcium, and lanthanum.

21. The rechargeable electrochemical cell of claim 20, further comprising a current collector, coupled to the cathode, coated with electrically conductive and yet oxidation resistant material.

22. The rechargeable electrochemical cell of claim 21, wherein the current collector is a mesh comprising at least one of titanium, stainless steel, tantalum, and niobium.

23. A rechargeable electrochemical cell, comprising:
a cathode comprising manganese dioxide;
an anode comprising zinc; and
a mixed ion electrolyte solution with a pH ranging from 3 to 7, wherein the solution comprises both monovalent salts and divalent salts.

24. The rechargeable electrochemical cell of claim 23, wherein the monovalent salt comprises at least one of lithium, sodium, potassium, ammonium, rubidium and cesium cations.

25. The rechargeable electrochemical cell of claim 24, wherein the divalent salt comprises at least one of zinc, manganese, barium, and magnesium cations.

26. The rechargeable electrochemical cell of claim 1, wherein the monovalent salt comprises at least one of lithium, sodium, potassium, ammonium, rubidium and cesium cations.

27. The rechargeable electrochemical cell of claim 26, wherein the divalent salt comprises at least one of zinc, manganese, barium, and magnesium cations.

* * * * *